E. Haight,
Paddle Wheel.
Nº 50,817.  Patented Nov. 7, 1865.
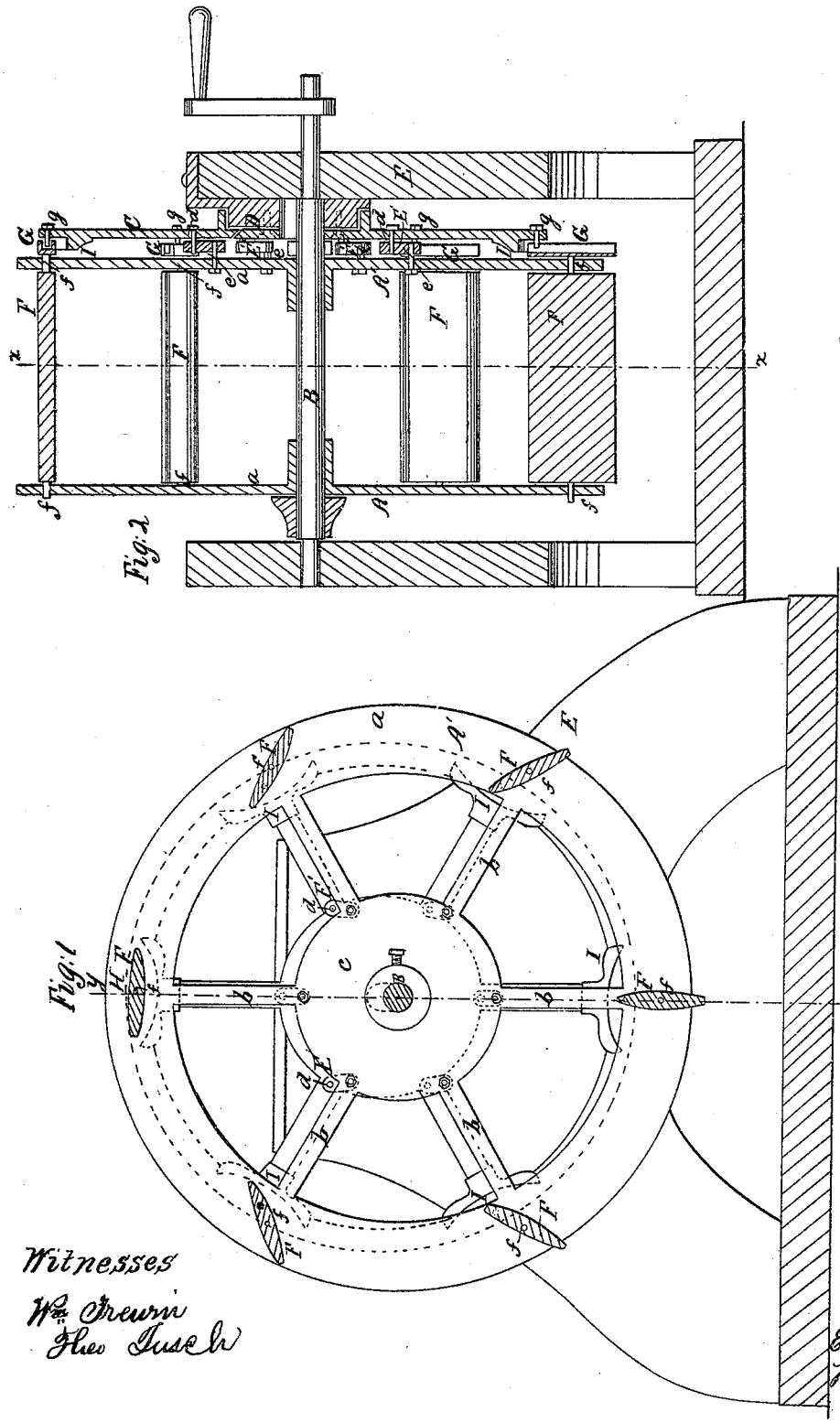
Witnesses
Wm Grewn
Theo Tusch
Inventor
Edgar Haight
per Munn & Co
Attorneys

UNITED STATES PATENT OFFICE.

EDGAR HAIGHT, OF BUFFALO, NEW YORK.

IMPROVED FEATHERING PADDLE-WHEEL.

Specification forming part of Letters Patent No. 50,817, dated November 7, 1865.

*To all whom it may concern:*

Be it known that I, EDGAR HAIGHT, of the city of Buffalo, county of Erie, and State of New York, have invented certain new and useful Improvements in Paddle-Wheels; and I do hereby declare that the following is a full, clear, and exact description thereof, reference being had to the accompanying drawings, making a part of this specification, in which—

Figure I is a sectional side elevation of my improved wheel, taken at the line $x\,x$, Fig. II. Fig. II is a cross-sectional elevation of same on line $y\,y$ of Fig. I. Figs. III and III$^a$ are diagrams illustrating the principle of my invention.

The nature of my invention consists in supporting the paddle-buckets on the wheel-rims by axial journals and causing each bucket to turn on its axis during the revolution of the wheel (by means hereinafter described) in such manner that the plane of its propelling-surface shall at all times radiate from an imaginary fixed point at the summit of the wheel, and consequently maintain an effective propelling position during its entire passage through the water when the wheel is partially immersed, and also present no retarding bucket-surface when the wheel is wholly immersed, thus giving it great advantages over either the common radial paddle-wheel or screw-propeller.

Letters of like name and kind refer to like parts in each of the figures.

A A' represent the side frames of the wheel, placed on the shaft B at a proper distance apart for the reception of the paddle-buckets between them. They each consist of a circular rim, $a$, radial arms $b\,b$, and hub $c$, and are keyed or otherwise fastened upon the shaft B.

F represents the paddle-buckets, which are supported at each end by axial journals $f$, set in appropriate bearings in the rims $a\,a$, and turn thereon as the revolution of the wheel causes them to change position, as hereinafter described.

C represents an eccentric wheel or rim placed at one side of the paddle-wheel, and of a diameter either less or greater than that of the rims $a\,a$, (less by preference, as represented in the drawings,) and supported upon a fixed hub, D, sufficiently eccentric to the shaft B on a perpendicular line to cause its summit or highest point to coincide with the summit or highest point of the paddle-rims $a\,a$, as shown at H.

The trunnion D may be bolted to the paddle-shaft, pillow-block, or to the framing F of the wheel-house, or secured in any other convenient manner.

The wheel C turns freely on the trunnion, and is driven from the side frame, A', of the main wheel, to which it is adjacent, by being connected therewith by a number of links, E', said links being pivoted at one end to the hub $c$ of frame A' by bolts $e$ and at the other to the hub of wheel C by bolts $d$. The length of these links must be equal to the eccentricity of the wheel C to compensate therefor. By these means the wheel C is given an angular velocity exactly equal to that of the paddle-rims. The wheel C is further provided with pins or studs $g$, which project laterally from the rim thereof, being in number equal to the number of buckets, and placed equidistant from each other. These pins project into the grooved ends of the paddle-buckets, as shown at G, which overhang the side frame, A', said grooves being parallel to the plane of the buckets, as represented. Each paddle-bucket has now two points of support—*i.e.*, its journal $f$ and the pin $g$—the one being on the paddle-rims and the other on the eccentric rim. It is by the variation in the relative position and distance apart of these two points of support occasioned during the revolution of the wheel by the eccentricity of the rim C, said distance changing from coincidence at the summit H to double the amount of eccentricity at the bottom, that the planes of the buckets are made to radiate from the summit H, as before stated, or, in other words, change from a horizontal position at the top to a vertical position at the bottom, and assuming during the passage all intermediate angles. This will be understood by reference to the diagrams, Figs. III and III$^a$, and the following description thereof.

In Fig. III let the circle J represent the paddle-rim at the bucket-journals. Let the circle K, of less diameter, drawn eccentric and tangent thereto at the point H, (representing the summit at the wheel,) represent the rim C at the line of the pins $g$. Assume the point H to represent the axis of a paddle-bucket when the wheel commences to revolve. Further, assume the point H to represent the position of the pin $g$ at starting. The circle J being divided into any number of equal parts, starting from H, the points of division 1 2 3 4, &c., show successive positions of the bucket-axis during the revolution of the wheel. The circle K being divided into the same number of equal parts, the points of division $g'$ $g^2$ $g^3$, &c., show the successive positions of the pin $g$ during the revolution of the rim C, when it travels with the same angular velocity of the wheel. Draw the lines $l'$ $l^2$ $l^3$, &c., through the corresponding points 1 2 3, &c., and $g'$ $g^2$ $g^3$, &c., and they will all pass through the summit H. Since by the mechanical construction of the wheel the bucket-axis (represented by points 1 2 3, &c.) and the eccentric-pins $g$ (represented by the points $g'$ $g^2$ $g^3$, &c.) must always lie in the plane of the bucket, the plane of the buckets extended will pass through the summit H during the entire revolution of the wheel. This law holds good with any number of divisions or any degree of eccentricity in the circles, as will at once be seen by reference to Fig. III$^a$. As each bucket passes the summit H its axis coincides with that of the pin $g$, so that at that point the bucket might turn into a vertical position, which would bring the slot G at right angles to the line of movement of the pin, and thereby occasion an undue strain on the pin in bringing the bucket back into its proper position. This is prevented by the curved brackets or guards, I, attached to the eccentric rim. This wheel is capable of being used either partially immersed, as is the case with common radial paddle-wheels, or wholly immersed, like a screw-propeller, and is equally efficient when turned in either direction. In the first case the buckets will enter, pass through and out of the water with the same inclinations or angles thereto as would occur in a radial paddle-wheel of double the diameter, but same immersion or dip, thus giving it great practical advantage over a radial wheel of equal diameter. In the latter case, although the buckets do not at all parts of their revolution maintain equally efficient propelling positions, yet they offer no retarding force, and have the advantage over a screw-propeller of a direct instead of an oblique action upon the water.

The extreme simplicity and efficacious action of the device, together with its strength and durability, make it an important improvement in the class of inventions to which it belongs.

Having thus described my invention, what I claim as new, and desire to secure by Letters Patent, is—

1. The combination of the axially-hung buckets F, having grooved ends G, and the eccentric rim C and pins $g$, by which the plane of the buckets may be made to radiate during their entire revolution from the summit of the wheel, substantially as described.

2. The brackets I, applied to the wheel C, to operate in connection with the buckets F, substantially as and for the purpose specified.

EDGAR HAIGHT.

Witnesses:
DANIEL BROWN,
JOHN H. VAN SLYKE.